(12) United States Patent
Charcranoon et al.

(10) Patent No.: US 7,245,830 B2
(45) Date of Patent: Jul. 17, 2007

(54) METHOD AND APPARATUS FOR SCHEDULING TRANSMISSION OF DATA BURSTS IN AN OPTICAL BURST SWITCHING NETWORK

(75) Inventors: Saravut Charcranoon, Richardson, TX (US); Tarek S. El-Bawab, Richardson, TX (US); Jong-Dug Shin, Seoul (KR); Hakki Candan Cankaya, Dallas, TX (US)

(73) Assignee: Alcatel-Lucent, Paris (FR)

( * ) Notice: Subject to any disclaimer, the term of this patent is extended or adjusted under 35 U.S.C. 154(b) by 678 days.

(21) Appl. No.: 10/418,588

(22) Filed: Apr. 17, 2003

(65) Prior Publication Data

US 2004/0062263 A1    Apr. 1, 2004

Related U.S. Application Data

(60) Provisional application No. 60/411,831, filed on Sep. 18, 2002.

(51) Int. Cl.
 *H04J 14/00* (2006.01)
(52) U.S. Cl. .................. 398/51; 398/45; 398/46; 398/48; 398/50; 370/395.4
(58) Field of Classification Search .......... 398/45–57; 370/230, 431–463, 395.4
 See application file for complete search history.

(56) References Cited

U.S. PATENT DOCUMENTS

| | | | | |
|---|---|---|---|---|
| 6,091,728 A * | 7/2000 | Lazraq et al. | ............ | 370/395.7 |
| 6,643,293 B1 * | 11/2003 | Carr et al. | ............ | 370/399 |
| 6,687,225 B1 * | 2/2004 | Kawarai et al. | ......... | 370/230.1 |
| 6,721,315 B1 * | 4/2004 | Xiong et al. | ............... | 370/389 |
| 6,804,255 B1 * | 10/2004 | Zheng et al. | ............... | 370/468 |
| 6,819,870 B1 * | 11/2004 | Ge et al. | ...................... | 398/51 |
| 6,898,205 B1 * | 5/2005 | Chaskar et al. | ............. | 370/450 |
| 6,963,564 B1 * | 11/2005 | Liu | ............................. | 370/389 |
| 7,023,857 B1 * | 4/2006 | Chiussi et al. | ........... | 370/395.4 |
| 7,190,898 B2 * | 3/2007 | Kim et al. | ..................... | 398/51 |
| 2002/0054732 A1 * | 5/2002 | Zheng | ......................... | 385/24 |

(Continued)

OTHER PUBLICATIONS

Chunming Qiao et al., "Optical burst switching (OBS)—a new paradigm for an Optical Internet", Journal of High Speed Networks (8), 1999, pp. 69-84.

(Continued)

*Primary Examiner*—Kenneth Vanderpuye
*Assistant Examiner*—Luis Garcia
(74) *Attorney, Agent, or Firm*—Danamraj & Youst, P.C.; V. Lawrence Sewell

(57) ABSTRACT

Apparatus and method for scheduling transmission of data bursts in an OBS network are described. One embodiment is a router in an OBS network, the router comprising a grouper module for collecting a group of BHPs arriving during a BHP collecting period and classifying each BHP of the group of BHPs into corresponding baskets depending on the data channel scheduling window of its corresponding data burst; a classifier and channel assignment module for assigning data bursts to appropriate data channels; and a channel scheduler for constructing an interval graph representing data bursts corresponding to BHPs classified in a single one of the baskets having overlapping segments on each data channel as adjacent vertices and scheduling data bursts on each data channel based on a process that finds a maximum number of non-adjacent vertices on the interval graph.

21 Claims, 6 Drawing Sheets

U.S. PATENT DOCUMENTS

2002/0118419 A1* 8/2002 Zheng et al. ............... 359/139
2002/0118421 A1* 8/2002 Xiong et al. ............... 359/140

OTHER PUBLICATIONS

Donald J. Rose et al., "Algorithmic Aspects of Vertex Elimination on Graphs", Siam Journal of Computing (5), 1976, pp. 266-283.

Jolyon A. White et al., "Merit-based Scheduling Algorithm for Optical Burst Switching", Conference on Optical Internet, COIN 2002 (Korea), Jul. 2002, pp. 75-77.

Martin Charles Golumbic, "Algorithmic Graph Theory and Perfect Graphs", Academic Press 1980, Chapter 3 et seq., pp. 51 et seq.

* cited by examiner

METHOD AND APPARATUS FOR SCHEDULING TRANSMISSION OF DATA BURSTS IN AN OPTICAL BURST SWITCHING NETWORK

PRIORITY UNDER 35 U.S.C. §119(e) & 37 C.F.R. §1.78

This nonprovisional application claims priority based upon the following prior U.S. provisional patent application entitled: INTERVAL SCHEDULING FOR OPTICAL BURST SWITCHING, Ser. No.: 60/411,831, filed Sep. 18, 2002, in the names of Saravut Charcranoon, Tarek S. El-Bawab, Jong-Dug Shin and Hakki C. Cankaya, which is hereby incorporated by reference for all purposes.

BACKGROUND OF THE INVENTION

1. Technical Field of the Invention

The present invention generally relates to optical burst switching ("OBS") networks. More particularly, and not by way of any limitation, the present invention is directed to a method and apparatus for scheduling transmission of data bursts in such networks.

2. Description of Related Art

In burst switching technology, such as, in particular, optical burst switching ("OBS") technology, data bursts ("DBs"), each of which is made up of multiple packets, are switched optically at core nodes, or routers, in the OBS network. A small control packet, called the Burst Header Packet ("BHP") travels an offset time ahead of each DB along the same DB route and configures the optical switch for the duration of the DBs at the core node. In short, each BHP travels an offset time ahead of its associated DB and establishes a path for the DB.

Contention may occur between multiple PRP attempting to traverse the same link within the network. Several distributed scheduling algorithms with different behaviors and complexities have been suggested for use in OBS networks. OBS network performance can be defined in terms of burst loss ratio, which is the percentage of bursts lost during scheduling. Existing scheduling algorithms are inefficient and result in high burst loss ratio in OBS systems.

The problem of scheduling data bursts in OBS networks is to be solved in such a way that can optimize the resource utilization and improve scheduling performance. A well known solution is the Just-Enough-Time ("JET") scheduling scheme, which is an example of a scheduling solution that schedules DBs on a one-by-one basis immediately after the bursts or their associated burst header packets ("BHPs") are received. Since the scheduling decision is based on only the current burst, on a long-term basis, this solution can lead to a sub-optimal scheduling performance and relatively less efficient resource utilization. Further, the existing solutions, such as JET, that aim to provide service differentiation either have a problem of fairness in resource allocation or impose additional complexity.

SUMMARY OF THE INVENTION

Accordingly, the present invention advantageously provides method and apparatus for scheduling transmission of data bursts in an OBS network.

One embodiment is a router in an optical burst switched ("OBS") network, the router receiving and transmitting data bursts on data channels and receiving and transmitting on control channels burst header packets ("BHPs") that include switching information for corresponding data bursts. The router comprises means for collecting a group of BHPs arriving during a BHP collecting period and classifying each BHP of the group of BHPs into corresponding baskets depending on the data channel scheduling window of its corresponding data burst; means for assigning data bursts to appropriate data channels; and means for constructing an interval graph representing data bursts corresponding to BHPs classified in a single one of the baskets having overlapping segments on each data channel as adjacent vertices and scheduling data bursts on each data channel based on a process that finds a maximum number of non-adjacent vertices on the interval graph.

Another embodiment is a router in an OBS network, wherein the router includes a first set of optical input data channels for receiving data bursts in synchronous fixed length time slots and a second set of output optical data channels for output of the data bursts from the router, and wherein the router further includes a set of optical input control channels for receiving BHPs that include switching information for corresponding data bursts. The router comprises a BHP grouper module that identifies BHPs corresponding to data bursts within a data channel window and classifies incoming BHPs into different baskets depending on the data channel window of their corresponding data burst; a classifier and channel assignment ("CCA") module that assigns data bursts to appropriate channels; and a channel scheduler module that constructs an interval graph representing data bursts with overlapping segments on each data channel as adjacent vertices and schedules data bursts on each data channel based on a process that finds a maximum number of non-adjacent vertices on the interval graph.

Yet another embodiment is a method of scheduling transmission of data bursts for implementation in a router in an OBS network, the router receiving and transmitting data bursts on data channels and receiving and transmitting on control channels burst header packets BHPs that include switching information for corresponding data bursts. The method comprises collecting a group of BHPs arriving during a BHP collecting period; classifying each BHP of the group of BHPs into corresponding baskets depending on the data channel scheduling window of its corresponding data burst; assigning data bursts to appropriate data channels; and scheduling data bursts on each data channel.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
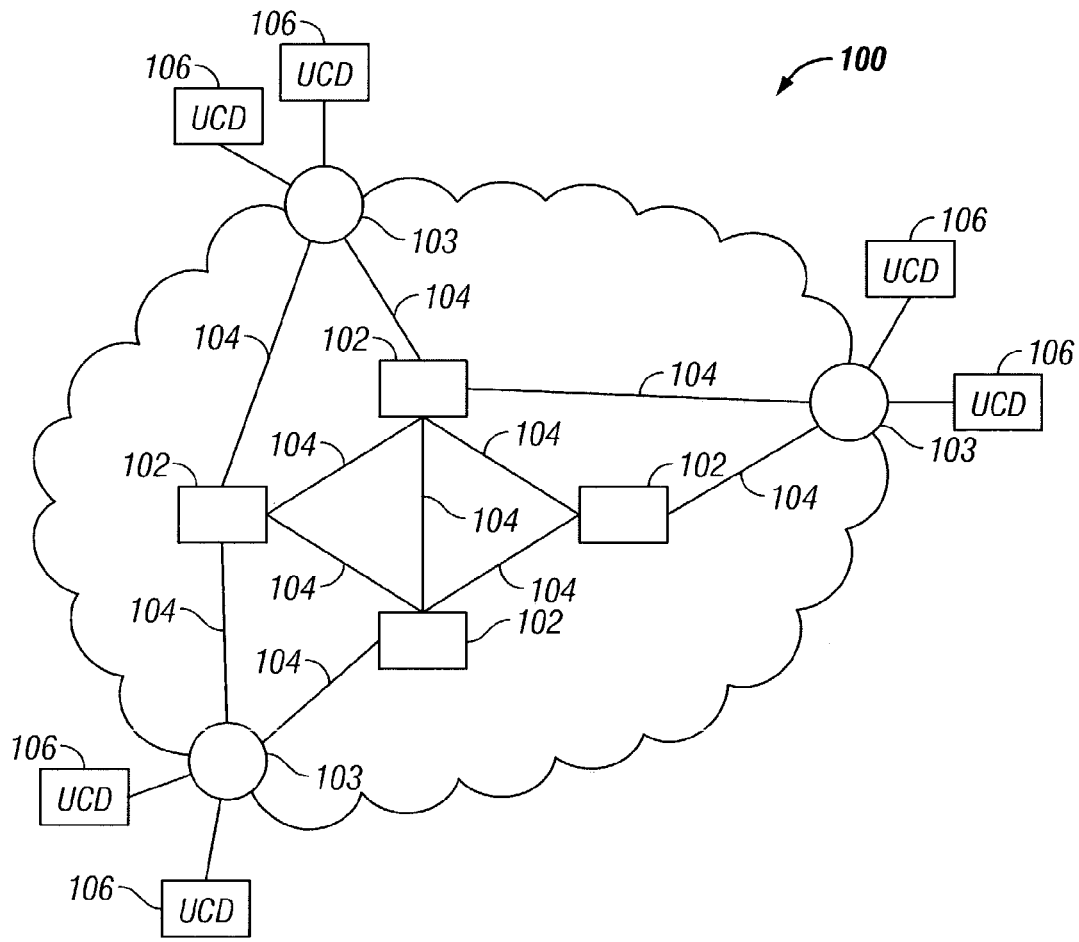
FIG. 1 is a functional block diagram of an OBS network for implementing one embodiment.

In the drawings, like or similar elements are designated with identical reference numerals throughout the several views thereof, and the various elements depicted are not necessarily drawn to scale.

An interval scheduling system of one embodiment operates in a semi-offline mode; that is, instead of scheduling a DB immediately upon receipt of the BHP thereof, interval scheduling system defers the decision-making for some time period, referred to as the "BHP collecting window", during which arriving BHPs are collected and grouped. At this point, the interval scheduling system makes a single scheduling decision for all of the BHPs in the group collectively and simultaneously. This approach of "delayed scheduling" exposes the interval scheduling system to useful information regarding future DBs that would otherwise be unknown. This feature renders the interval scheduling system capable of making more efficient scheduling decisions.

Moreover, as opposed to an off-line scheduling technique in which receipt of all inputs (or BHP) is awaited, the interval scheduling system of one embodiment divides the whole scheduling process into a sequence of small subprocesses and makes a scheduling decision once in every subprocess. Hence, it is able to schedule bursts in a timely fashion and has the potential to improve resource utilization in OBS networks.

In the interval scheduling system of one embodiment, a DB is viewed as a time period on a data-channel time line. The beginning of a DB period is identified by its arrival time and the duration of the period is specified by the length of the DB. Such information is obtained from the associated BHP. As will be described in greater detail below, using this view of a DB, the interval scheduling system can construct an "interval representation profile" for a given set of DBs. This profile can be deployed to create an "interval graph", which in turn can be optimized for scheduling the maximum number of non-overlapping intervals in the channel time period under consideration. These non-overlapping intervals are the DBs that can be transmitted without conflict on the data channel.

An interval scheduling system in an OBS network operates in a distributed manner where a scheduling decision at each core node is made locally and independently. Each core node along a path from an ingress node to an egress node is responsible for scheduling bursts on its outgoing links and it does so independently Therefore; the OBS network requires protocol/signaling to coordinate the scheduling process among nodes along a DB path. One of the candidate protocols is known by those of ordinary skill in the art as "tell-and-wait". In tell-and-wait, an ingress node sends out a BHP a predetermined time period (the "offset time") before it transmits the corresponding DB. The offset time (which is specified in the BHP) specifies the duration the ingress node must hold the DB after releasing its BHP.

FIG. 1 illustrates an exemplary OBS network 100 in accordance with one embodiment. The OBS network 100 comprises a plurality of OBS-capable core nodes 102 and OBS-capable edge nodes 103 interconnected via fiber optic links 104. Each of a plurality of user communications devices ("UCDs") 106 interfaces with the network 100 via one of the edge nodes 103. In operation, data originating from a first UCD 106 and destined for a second UCD 106 enters the network 100 via one of the edge nodes 103 to which the first UCD is connected (referred to as the "ingress node") and is routed through one or more of the core nodes 102 to the one of the edge nodes 103 to which the second UCD is connected (referred to as the "egress node"), which transmits it to the second one of the UCDs 106.

As previously noted, in OBS technology, DBs comprising multiple data packets are switched optically at the sore nodes 102 of the OBS network 100, wherein a BHP associated with each DB travels an offset time ahead of the DB along the same route and configures the optical switch for the duration of the DB at the core node.

Figure 2:
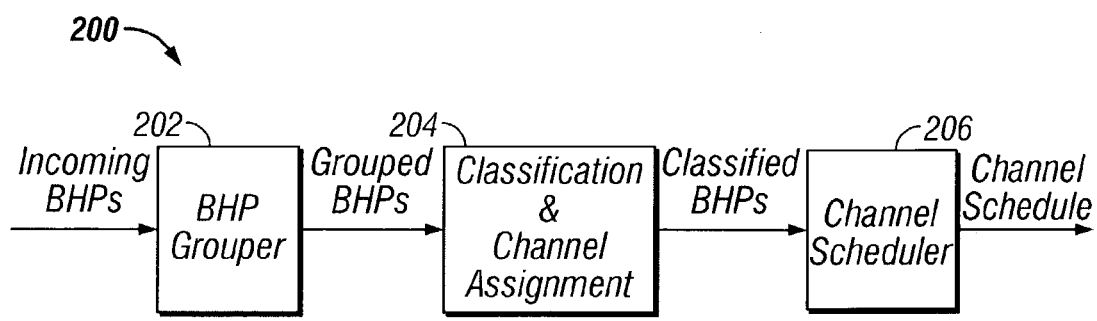
FIG. 2 is a functional block diagram of an interval scheduling system of one embodiment.

FIG. 2 illustrates an interval-scheduling system 200 in accordance with one embodiment. The system 200 is incorporated into each of the core nodes 102 of the network 100. It will be recognized that, although the interval scheduling technique described herein may be implemented in all nodes 102, 103, it is generally only necessary to implement the technique in core nodes 102, as edge nodes 103 generally do not need to make scheduling decisions. The system 200 includes a BHP grouper module 202, a classifier and channel assignment ("CCA") module 204, and a channel scheduler module 206, each of which will be described in detail below.

Generally, the BHP grouper module 202 sorts, or groups, BHPs arriving at the node during a time interval referred to as the "BHP collecting window" according to a time interval (a "scheduling window") in which their associated DBs are to be scheduled for transmission. The CCA module 204 examines each group of BHPs, classifies them (e.g., according to class of service), and queues them according to a predefined channel management policy. The channel scheduler module 206 schedules transmission of the DBs onto a channel.

Figure 3:
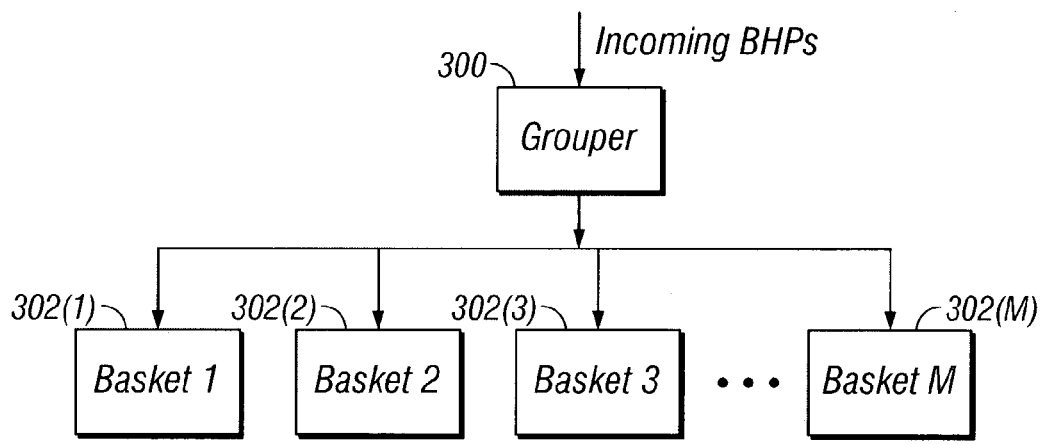
FIG. 3 is a functional block diagram of a grouper module of the interval scheduling system of FIG. 2.

FIG. 3 is a more detailed block diagram of the BHP grouper module 202 of the system 200. As will be described in greater detail with reference to FIG. 7, all BHPs that arrive at the node during the same BHP collecting window are considered together.

By observing at the arrival times and durations of the DBs associated with the collected group of BHPs, a grouper 300 determines a data channel, or scheduling, window within which the associated DBs are to be transmitted. The grouper 300 then assigns each BHP to an appropriate one of M baskets 302(1)-302(M), as illustrated in FIG. 3, each of which corresponds to a different scheduling window. In particular, further referring to FIG. 3, the basket 302(1) collects all BHPs of the collected group of BHPs that correspond to DBs that are to be transmitted on a channel during a scheduling window defined by the time period [$W_{start}$, $W_{stop}$]; the basket 302(2) collects all BHPs of the collected group of BHPs that correspond to DBs that are to be transmitted on a channel during a scheduling window defined by the time period [$W_{start}$+one window period, $W_{stop}$+one window period]; and so on.

Within each of the baskets 302(1)-302(M), BHPs may be sorted, e.g., in order of the arrival times of their associated DBs. Such sorting proves useful to the CCA module 204 in connection with multiple-channel systems. For example, overlapping bursts can be forwarded to different channels in order to reduce burst-loss probability.

Figure 4:
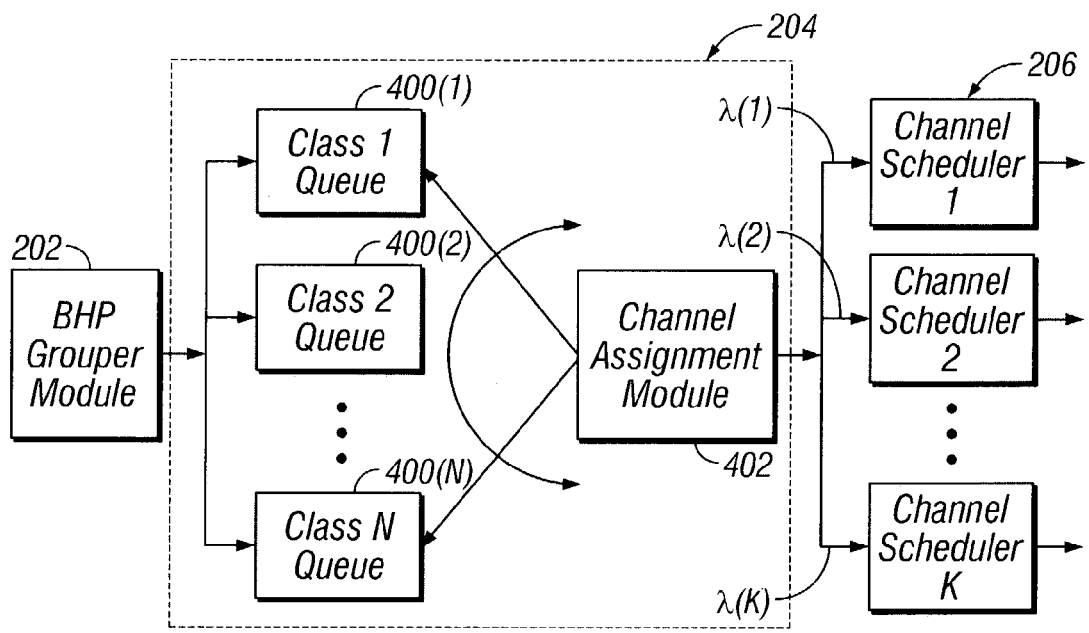
FIG. 4 is a functional block diagram of a classification and channel assignment module and a channel scheduler module of the interval scheduling system of FIG. 2.

A more detailed block diagram of the CCA module 204 and channel scheduling module 206 is illustrated in FIG. 4. The CCA module 204 performs channel, or wavelength, allocation and/or service differentiation in a conventional manner. Service differentiation can be provided by employing, for example, a priority scheme, a weighted round-robin discipline, a weighted fair queue, or a pre-assigned proportion of BHPs from each class. For purposes of illustration, it will be assumed that a system of assigned weights to differentiate service among classes is employed.

At the output of the BHP grouper module 202, BHPs of the basket corresponding to the most imminent scheduling window, in this case, the basket 302(1), are classified into classes and placed in the appropriate one of N queues 400(1)-400(N). This basket is then dropped from the group of baskets and all of the other baskets are "moved up." Additional baskets corresponding to even more future scheduling windows may be added as needed; that is, as BHPs corresponding to DBs that need to be transmitted during those future windows are collected at the BHP grouper module 202.

Each BHP is assigned a relevant class weight. In case of a single class, a single queue is deployed and BHPs will have the same weight. A channel assignment unit 402 retrieves BHPs from the queues 400(1)-400(N) and places them onto the appropriate channel(s) $\lambda(1)$-$\lambda(K)$ This is the point at which channel management leads to efficient resource utilization and service differentiation. In the single channel, or the parallel model, case there is only one channel scheduler and the channel assignment task is reduced to allocation of DBs of various classes on this channel.

The channel scheduler module 206 comprises a plurality of channel scheduler units 1 through K, one per each channel $\lambda(1)$-$\lambda(K)$, that schedule transmission of BHPs based on a specification of the start and end times of their corresponding DBs in accordance with one embodiment of the interval scheduling technique described herein. The primary objective is to maximize the number of BHPs, and accordingly, DBs, to be scheduled in a scheduling window. The scheduler module 206 supports service differentiation, which complements the support provided by the CCA module 204, resulting in efficient support of service differentiation in the OBS network 100.

Figure 5:
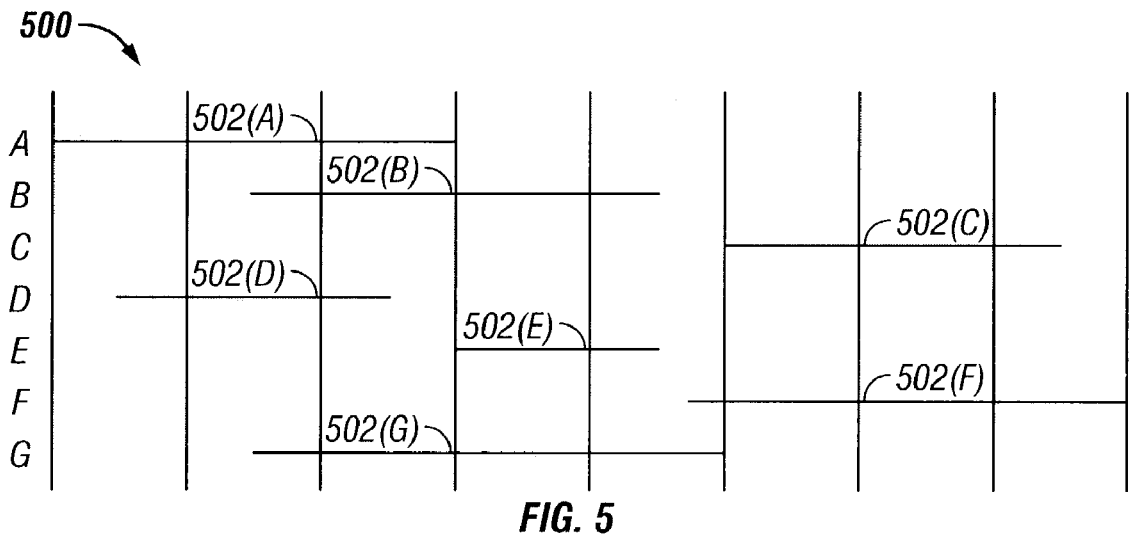
FIG. 5 illustrates an interval representation profile for use in connection with the interval scheduling system of FIG. 2.
Figure 6:
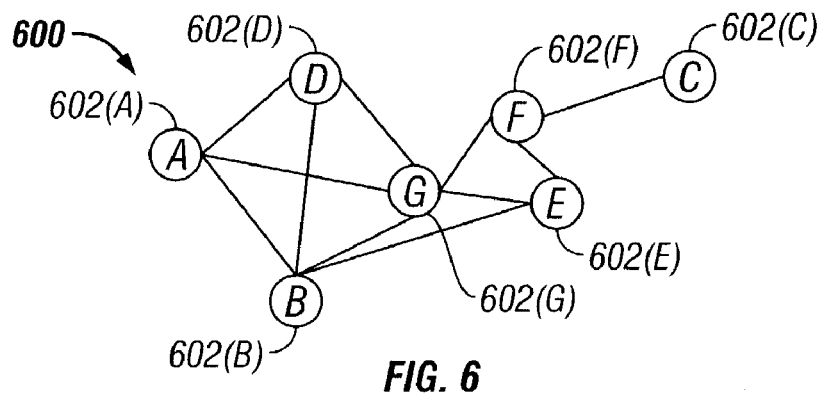
FIG. 6 illustrates an interval graph for use in connection with the interval scheduling system of FIG. 2.

For a set of BHPs/DBs scheduled to be transmitted during a particular scheduling window, a channel scheduler, e.g., the channel scheduler unit 1, first establishes an "interval representation profile," as illustrated in FIG. 5 and designated by reference numeral 500. The profile 500 exemplifies seven DBs 502(A)-502(G) with various start times and durations. Once an interval representation profile is created, it is transformed to an "interval graph." FIG. 6 depicts an interval graph 600 corresponding to the interval representation profile 500 illustrated in FIG. 5. Each vertex 602(A)-602(G) of the graph 600 corresponds to one of the DBs 502(A)-502(G) of the profile 500. A line, or "edge", connects two vertices if and only if their corresponding DBs overlap with one another. For example, the DBs 502(A) and 502(B) overlap one another; therefore, there is an edge connecting the vertex 602(A) with the vertex 602(B) in the graph 600. In contrast, the DBs 502(D) and 502(E) do not overlap with one another; therefore, there is not an edge connecting the vertex 602(D) with the vertex 602(E) in the graph 600. As used herein, the term "adjacent vertices" refers to vertices of an interval graph that are connected by an edge; "non-adjacent vertices" refers to vertices of an interval graph that are not connected by an edge.

Based on the interval graph 600, the channel scheduler 206 applies a process to determine a set containing the maximum number of non-overlapping DBs under a set of specified constraints. For example, there are two possible sets containing the maximum number of non-overlapping DBs: the set {C, E, D} and the set {C, E, A}. The channel scheduler 206 can select either set depending on the criteria deployed in the process implemented thereby. One such process, referred to herein as the maximum stable set ("MSS") interval scheduling process; is described below.

In general, MSS refers to a set containing a maximum number of non-adjacent vertices; that is, a set containing a maximum number of vertices of which no one member of the set is adjacent to any other one member of the set. Since the interval graph, such as the graph 600 (FIG. 6), is a perfect graph, a polynomial time algorithm is available to find the maximum stable set on any such interval graph. This is the MSS interval scheduling process. Prior to application of this process, a perfect vertex elimination order must be obtained. It should be noted that each vertex of an interval graph also has a value and length quantity associated therewith.

In a first step of the process, an interval representation profile, such as the profile 500 (FIG. 5), is created from the given group of eligible BHPs. Based on the interval representation profile, an interval graph (in the form of an adjacency set), such as the interval graph 600 (FIG. 6), is constructed. Next, a Lexicographic Breadth First Search ("LexBFS") algorithm is applied to produce a perfect vertex elimination order. Generally, given an interval graph G=(V, E), where V is a set of vertices and E is a set of edges, the LexBFS algorithm may be applied to the graph G in order to produce a perfect vertex elimination order ("σ"), a subset of vertices from the underlying interval graph G that posses a certain relationship. Additional details regarding the LexBFS algorithm may be found in D. J. Rose, R. E. Tarjan, and G. S. Leuker, "Algorithmic Aspects of Vertex Elimination on Graphs," SIAM Journal of Computing (5) 1976, which is hereby incorporated by reference for such purpose.

Next, the MSS algorithm is applied to obtain a stable set with the maximum number of vertices. Generally, given an interval graph G and the induced perfect vertex elimination order o, the MSS algorithm, set forth below, identifies a collection of all feasible stable sets with the corresponding total values and total lengths. The stable set with the maximum elements is then chosen to be scheduled.

The following is pseudo-code for implementing an embodiment of the MSS algorithm referred to above:

```
begin
    j←0
    while n≠0 do   //n number of vertices//    # loop 1
    begin
        X←Φ
        Stable Set (j)←σ(1);
        Value (j)←Weight (σ(1));
        Period (j)←Period (σ(1));
        K←0;
        X←{x∈∈dj (σ(1)) | 1<σ⁻¹(x))};
        N←n-1
        if (N≠0) do      # loop 2
        begin
            for (i←2 to n) do      # loop 3
            begin
                if (σ(1)∈X)do        # loop 4
                begin
                    k←K+1
                    σ(k)←σ(1)
```

-continued

```
                    go out of the for loop # 3
                end    //if # loop 4//
            else
            begin
                Stable Set (j)←Stable Set (j) ∪ σ(1)
                Value (j)←weight (σ(1))+Value (j)
                Length(j)←Length(σ(1))+Length(j);
                X←X ∪ {x∈Adj(σ(1)) | 1<σ⁻¹(x)};
                N←N-1
            end    //else # loop 5//
        end    //for # loop 3//
    end    //if # loop 2//
    n←N
    j←j+1
    end    //while # loop 1//
end
```

Figure 7:
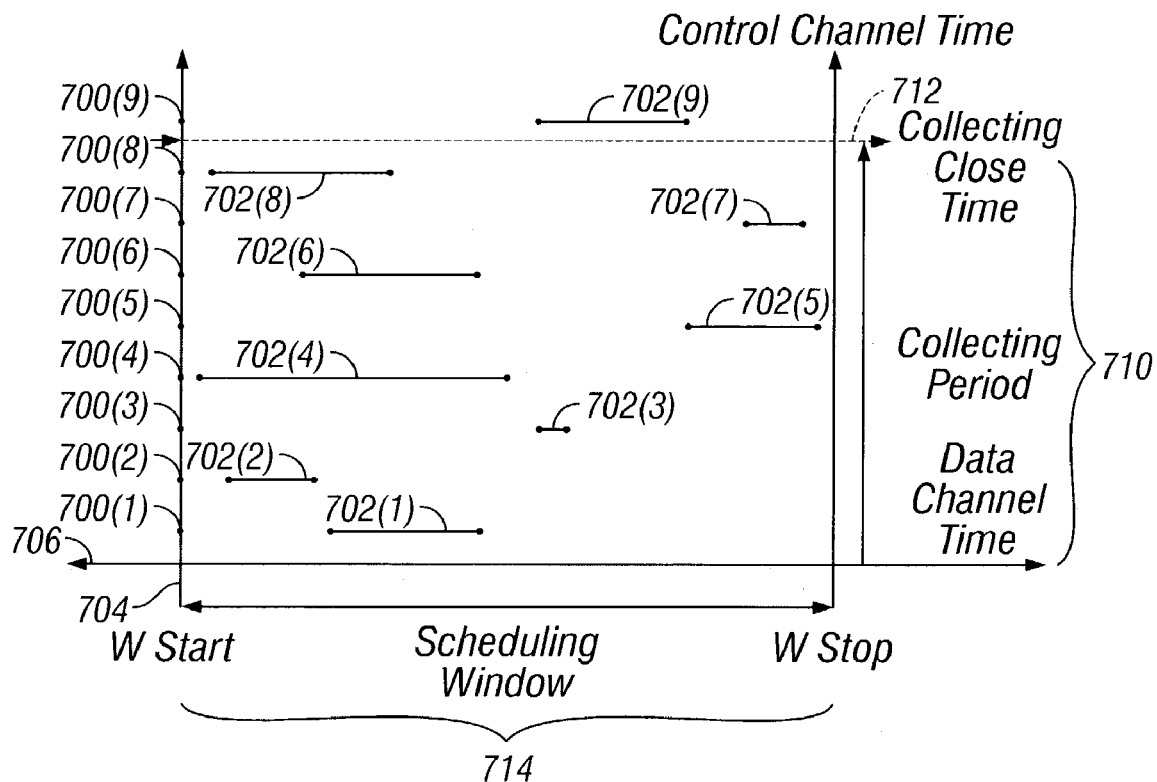
FIG. 7 illustrates the timing relationship between BHPs and their respective DBs in accordance with one embodiment.

FIG. 7 illustrates the timing relationship between BHPs 700(1)-700(9) and their associated DBs 702(1)-702(9) and between a BHP collecting window and a scheduling window. The BHPs 700(1)-700(9) are shown in relation to control channel time, represented in FIG. 7 by a vertical axis 704, and the DBs 702(1)-702(9) are shown in relation to data channel time, represented by a horizontal axis 706. As illustrated in FIG. 7, the BHP 700(9) arrives after the close of a BHP collecting window 710, as indicated by a line 712; therefore, the DB 702(9) is therefore not eligible for scheduling in the current scheduling window 714. In contrast, the BHPs 700(1)-700(8) arrive within the BHP collecting window 710; therefore, the corresponding DBs 702(1)-702(8) are eligible for scheduling in the current scheduling window 714.

Figure 8:
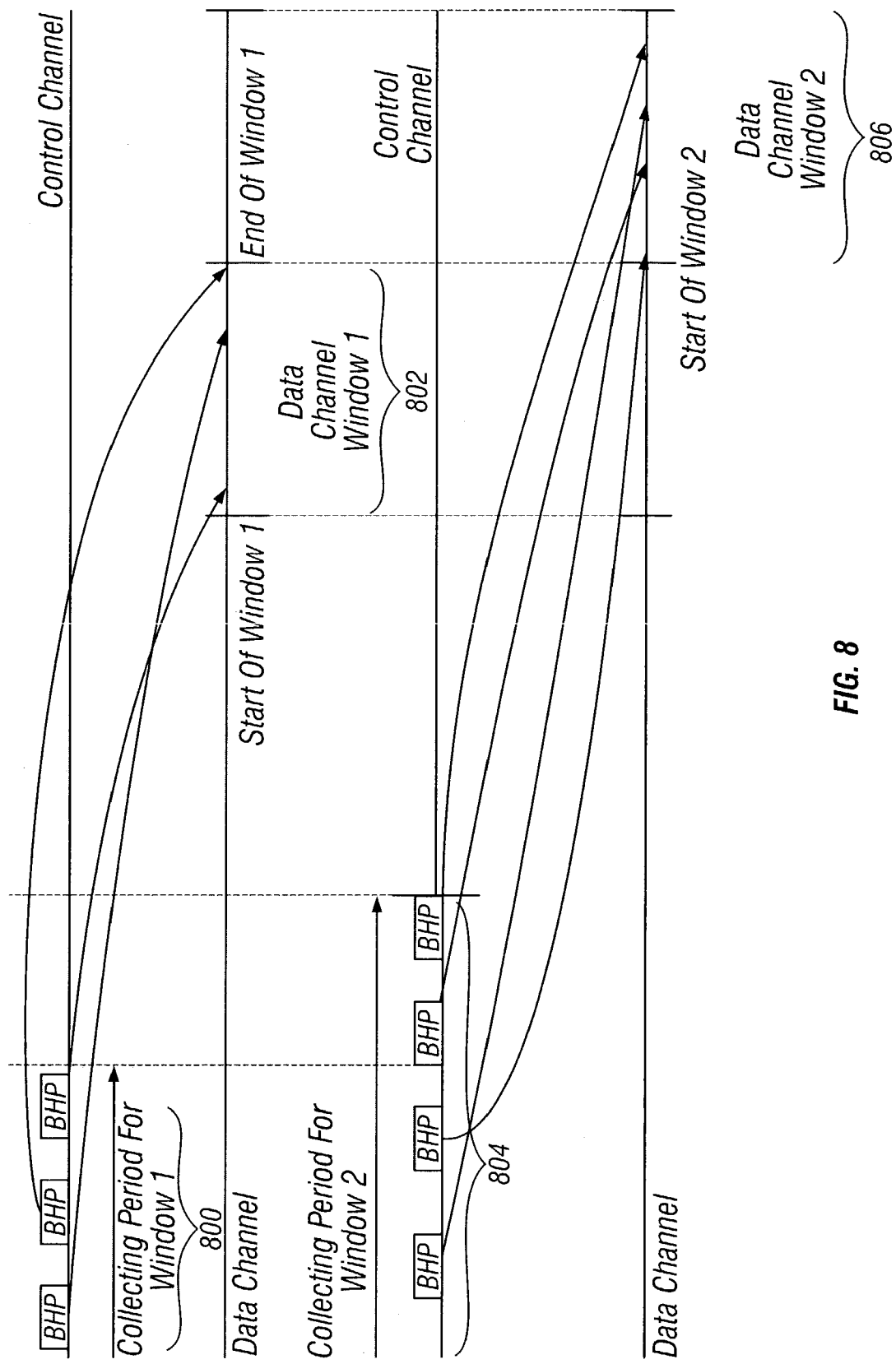
FIG. 8 illustrates a mapping process with respect to two BHP groups in accordance with one

Once the BHP collection process is complete for a BHP collecting window, the system 200 (shown in FIG. 2), in particular, the scheduling module 206, can make the scheduling decisions with respect to the DBs corresponding to the collected BHPs. FIG. 8 depicts the process of manning a first group of BHPs arriving on a control channel during a first BHP collecting period, designated by reference numeral 800, to a first data channel scheduling window 802, and a second group of BHPs arriving on a control channel during a second BHP collecting period, designated by reference numeral 804, to a second data channel scheduling window 806. It will be appreciated that each BHP collecting period occurs prior in time to the data channel scheduling window(s) to which it corresponds.

Figure 9:
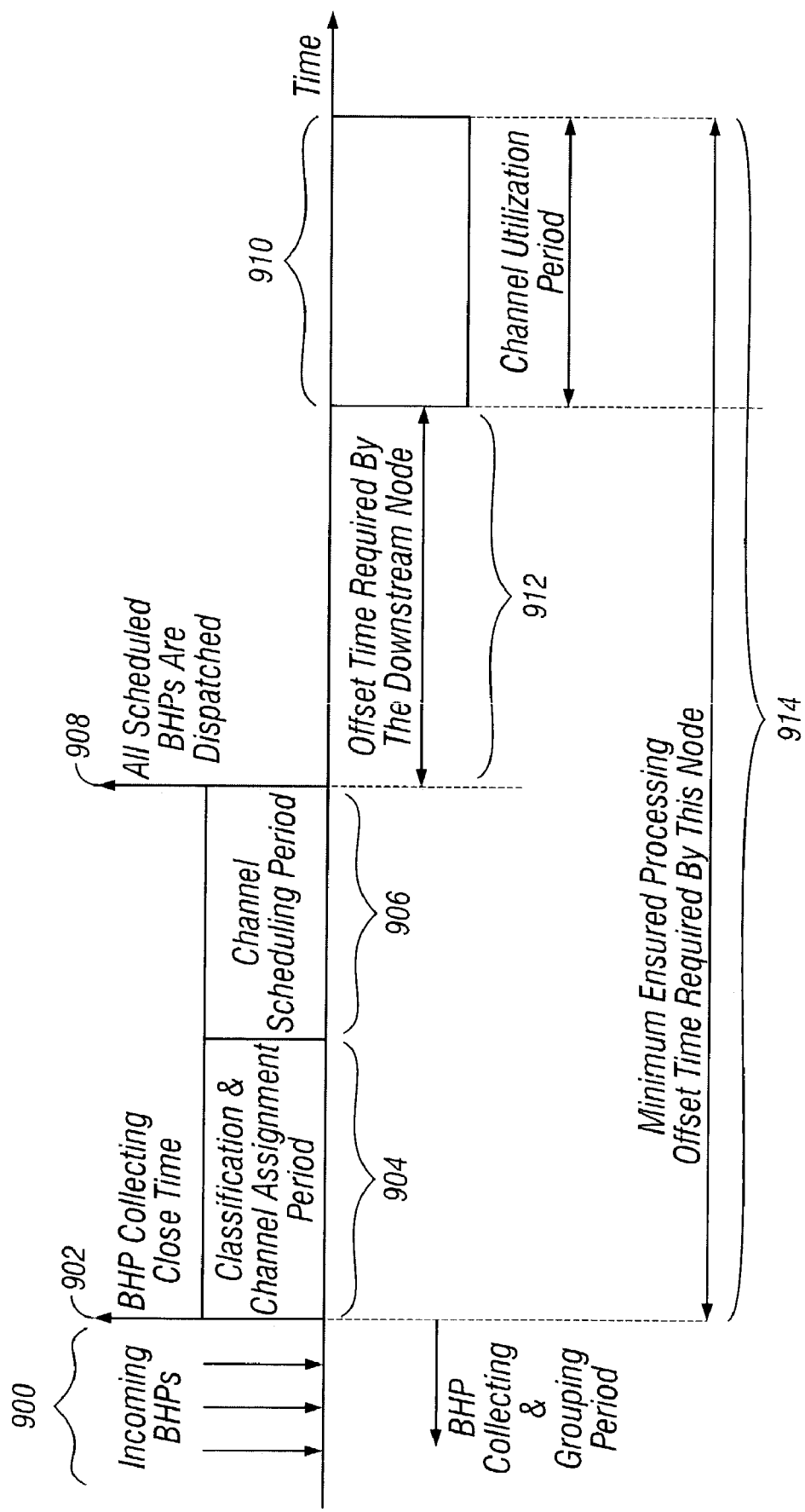
FIG. 9 is a timing diagram of the operation of one embodiment.

FIG. 9 is a timeline depicting the sequence of processes performed as seen by a core node for a single data channel scheduling window. During a time period designated by reference numeral 900, BHPs are collected and grouped. Accordingly, the time period 900 corresponds to the BHP collecting window. Subsequent to the close of the BHP collecting window (time period 900), designated by reference numeral 902, classification and channel assignment takes place during a time period 904. Once the data channel and a class of service are identified, BHPs are scheduled during a time period 906 and then a set of new BHPs are forwarded to the downstream at a point 908.

Upon the arrival at the node of the DBs corresponding to the dispatched BHPS, they are forwarded on the channel according to the schedule plan during the time period 910, which corresponds to the data channel scheduling window. It will be noted that scheduling must be completed some minimum time period 912 prior to the beginning of transmission of the DBs on the channel. The minimum ensured processing offset time required by the node is designated by reference numeral 914.

Figure 10:
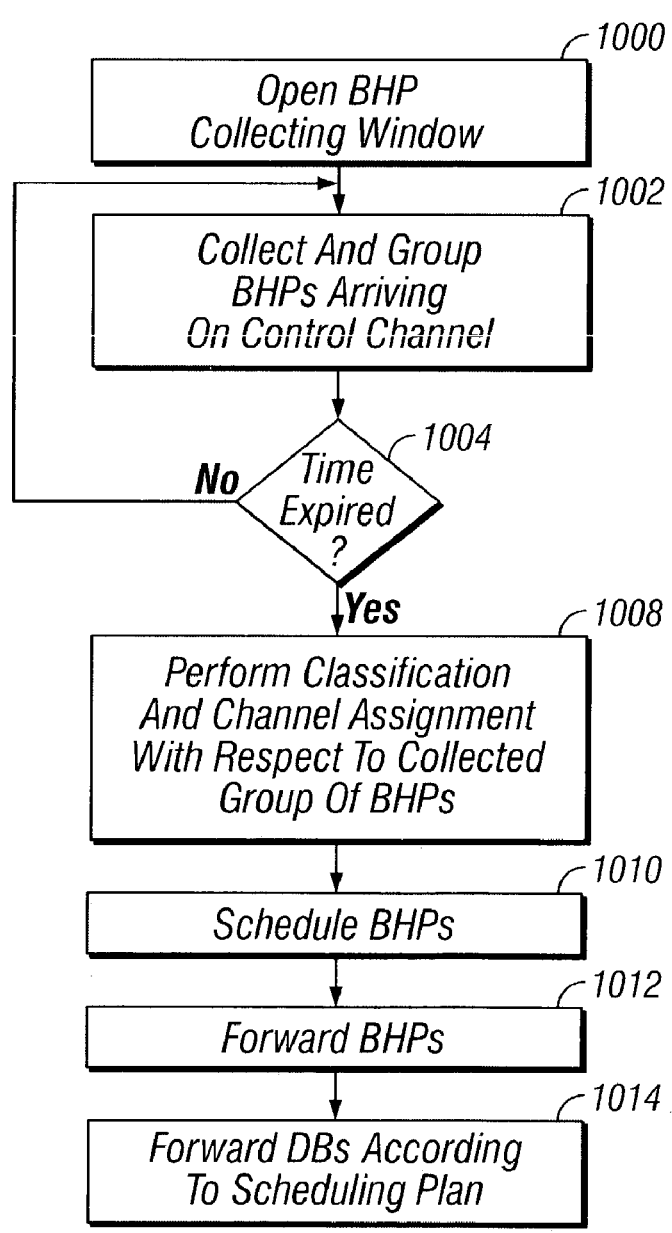
FIG. 10 is a flowchart of the operation of one embodiment.

FIG. 10 is a flowchart of the operation of one embodiment of the interval scheduling system. Operation of the system will be described with reference to a single node of an OBS network such as, for example, network 100 shown in FIG. 1. In step 1000, a BHP collecting window is opened and in step 1002, BHPs received at the node are collected and grouped according to the data channel scheduling window in which their associated DBs are to be transmitted. In step 1004, a determination is made whether the current BHP collecting window has expired, or closed. If not, execution returns to step 1002; otherwise, execution proceeds to step 1008.

In step 1008, classification and channel assignment are performed with respect to the group of BHPs collected in step 1002. In step 1010, the group of BHPs collected in step 1002 are scheduled and then forwarded in step 1012. In step 1014, DBs arriving at the node are transmitted on the data channel according to the scheduling plan developed in step 1010.

It will be recognized that the steps described with reference to FIG. 10 are performed with respect to each group of BHPs collected.

Several advantages over the prior art are realized by the embodiments described herein. Such advantages include the improvement of burst loss probability of approximately 5% in a single channel scenario; the improvement of channel utilization of approximately 5%; the ability to isolate burst loss probability of traffic from different classes; the ability to isolate throughput of traffic from different classes; and the ability to allocate channel resources fairly among traffic from various classes.

Based upon the foregoing Detailed Description, it should be readily apparent that the present invention advantageously provides a method and system for scheduling transmission of data bursts in an OBS network.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A router in an optical burst switched ("OBS") network, the router receiving and transmitting data bursts on data channels and receiving and transmitting on control channels burst header packets ("BHPs") that include switching information for corresponding data bursts, the router comprising:
    means for collecting a group of BHPs arriving during a BHP collecting period and classifying each BHP of the group of BHPs into a corresponding basket depending on a data channel scheduling window in which a data burst corresponding to a BHP is to be scheduled;
    means for assigning data bursts to appropriate data channels; and
    means for constructing an interval graph representing data bursts that correspond to BHPs classified in a single one of the baskets having overlapping segments on each data channel as adjacent vertices and for scheduling data bursts on each data channel based on a process that finds a maximum number of non-adjacent vertices on the interval graph.

2. The router of claim 1 wherein the means for collecting and classifying comprises a BHP grouper module.

3. The router of claim 1 wherein the means for assigning comprises a classifier and channel assignment ("CCA") module.

4. The router of claim 1 wherein the means for constructing and scheduling comprises a channel scheduler module.

5. The router of claim 1 wherein the means for constructing and scheduling comprises:
means for creating an interval representation from a group of eligible BHPs;
means for constructing an interval graph from the interval representation;
means for employing a Lexicographic Breadth First Search ("LexBFS") process to produce a perfect vertex elimination order; and
means for applying a Maximum Stable Set ("MSS") interval scheduling process to obtain a stable set with the maximum number of vertices.

6. The router of claim 5 further comprising means for allocating a data channel resource to data bursts corresponding to the vertices in the obtained MSS interval scheduling process.

7. The router of claim 5 wherein a data burst is represented in the interval representation profile by a time interval on a data channel time line and wherein the beginning of the time interval corresponds to the arrival time of the data burst and the duration of the time interval corresponds to the length of the data burst.

8. A router in an optical burst switched ("OBS") network, wherein the router includes a first set of optical input data channels for receiving data bursts and a second set of output optical data channels for output of the data bursts from the router, and wherein the router further includes a set of optical input control channels for receiving burst header packets ("BHPs") that include switching information for corresponding data bursts, the router comprising:
a BHP grouper module that identifies BHPs corresponding to data bursts to be scheduled within a data channel window and classifies incoming BHPs into different baskets depending on the data channel window in which the data bursts corresponding to BHPs are to be scheduled;
a classifier and channel assignment ("CCA") module that assigns data bursts to appropriate channels; and
a channel scheduler module that constructs an interval graph representing data bursts with overlapping segments on each data channel as adjacent vertices and schedules data bursts on each data channel based on a process that finds a maximum number of non-adjacent vertices on the interval graph.

9. The router of claim 8 wherein the BHP grouper module identifies a group of BHPs arriving at the router during a BHP collecting period and classifies the BHPs of the group of BHPs into different baskets depending on the data channel window of their corresponding data burst.

10. The router of claim 9 wherein the channel scheduler module constructs an interval graph representing corresponding data bursts of the BHPs of the group of BHPs.

11. The router of claim 8 wherein the channel scheduler module is operable to find a maximum number of non-adjacent vertices on the interval graph using a Maximum Stable Set ("MSS") interval scheduling structure.

12. The router of claim 11 wherein the structure that finds a maximum number of non-adjacent vertices on the interval graph comprises:
structure for creating an interval representation from a group of eligible BHPs;
structure for constructing an interval graph from the interval representation;
structure for employing a Lexicographic Breadth First Search ("LexBFS") process to produce a perfect vertex elimination order; and
structure for applying the MSS interval scheduling process to obtain a stable set with the maximum number of vertices.

13. The router of claim 12 wherein the channel scheduler module allocates a data channel resource to data bursts corresponding to the vertices in the obtained MSS.

14. The router of claim 12 wherein the group of eligible BHPs comprise BHPs collected during a BHP collecting period.

15. The router of claim 8 wherein the interval graph is constructed from an interval representation profile, wherein a data burst is represented in the interval representation profile by a time interval on a data channel time line, the beginning of the time interval corresponding to the arrival time of the data burst and the duration of the time interval corresponding to the length of the data burst.

16. A method of scheduling transmission of data bursts for implementation in a router in an optical burst switched ("OBS") network, the router receiving and transmitting data bursts on data channels and receiving and transmitting on control channels burst header packets ("BHPs") that include switching information for corresponding data bursts, the method comprising:
collecting a group of BHPs arriving during a BHP collecting period;
classifying each BHP of the group of BHPs into a corresponding basket depending on a data channel scheduling window in which a data burst corresponding to a BHP is to be scheduled;
assigning data bursts to appropriate data channels; and
scheduling data bursts on each data channel, including
processing, as a group, data bursts corresponding to BHPs classified in a single one of the baskets,
said processing including identifying ones of the processed data bursts having overlapping segments on a data channel.

17. The method of claim 16 wherein the scheduling of data bursts further comprises:
constructing an interval graph representing data bursts corresponding to BHPs classified in a single one of the baskets having overlapping segments on each data channel as adjacent vertices; and
scheduling data bursts on each data channel based on a process that finds a maximum number of non-adjacent vertices on the interval graph.

18. The method of claim 17 wherein the constructing of an interval graph comprises:
creating an interval representation from a group of eligible BHPs;
constructing an interval graph from the interval representation;
employing a Lexicographic Breadth First Search ("LexBFS") process to produce a perfect vertex elimination order; and
applying a Maximum Stable Set ("MSS") interval scheduling process to obtain a stable set with the maximum number of vertices.

19. The method of claim 18 further comprising allocating a data channel resource to data bursts corresponding to the vertices in the obtained MSS interval scheduling process.

20. The method of claim 18 wherein a data burst is represented in the interval representation profile by a time interval on a data channel time line and wherein the beginning of the time interval corresponds to the arrival time of the data burst and the duration of the time interval corresponds to the length of the data burst.

21. The method of claim 16, wherein said processing includes determining a set of data bursts containing the maximum number of data bursts not having overlapping segments.

* * * * *